United States Patent
Huang

(10) Patent No.: US 9,983,417 B1
(45) Date of Patent: May 29, 2018

(54) PAIR OF EYEGLASSES WITH CONVENIENTLY REPLACEABLE TEMPLES

(71) Applicant: Wen-Tse Huang, Kaohsiung (TW)

(72) Inventor: Wen-Tse Huang, Kaohsiung (TW)

( * ) Notice: Subject to any disclaimer, the term of this patent is extended or adjusted under 35 U.S.C. 154(b) by 0 days. days.

(21) Appl. No.: 15/496,024

(22) Filed: Apr. 25, 2017

(51) Int. Cl.
*G02C 5/14* (2006.01)
*G02C 5/22* (2006.01)
*G02C 3/00* (2006.01)

(52) U.S. Cl.
CPC ........... *G02C 5/2209* (2013.01); *G02C 3/003* (2013.01); *G02C 5/146* (2013.01); *G02C 2200/08* (2013.01); *G02C 2200/16* (2013.01)

(58) Field of Classification Search
CPC .... G02C 3/003; G02C 5/146; G02C 2200/08; G02C 5/22; G02C 5/2209
USPC ................... 351/116, 156, 153, 111; 16/228
See application file for complete search history.

(56) References Cited

U.S. PATENT DOCUMENTS

| 3,744,887 A * | 7/1973 | Dunbar | G02C 5/2209 16/225 |
| 5,898,471 A * | 4/1999 | Simioni | G02C 5/2209 16/228 |
| 8,944,591 B2 * | 2/2015 | Li | G02C 3/003 16/228 |

* cited by examiner

*Primary Examiner* — Hung Dang
(74) *Attorney, Agent, or Firm* — Alan D. Kamrath; Kamrath IP Lawfirm, P.A.

(57) ABSTRACT

A pair of eyeglasses includes a spectacles frame and two temples. The spectacles frame has a mounting adapter at each lateral end thereof. A pivot hole and two engaging holes are provided in the mounting adapter. A front end of each temple is provided with two connecting rods and a pivot shaft formed at outer ends of the connecting rods. The pivot shaft is held inside the pivot hole of a corresponding mounting adapter to allow each temple relative to the spectacles frame to be pivoted between a folded position and an extended position. When the temple is at the folded position, the connecting rods are separated from the engaging holes such that the temple can be detached from the spectacles frame. When the temple is at the extended position, the connecting rods are held and positioned inside the engaging holes.

3 Claims, 6 Drawing Sheets

US 9,983,417 B1

PAIR OF EYEGLASSES WITH CONVENIENTLY REPLACEABLE TEMPLES

BACKGROUND OF THE INVENTION

1. Field of the Invention

The present invention relates to a structure with temples and a spectacles frame assembled and, more particularly, to a pair of eyeglasses with different styles of temples which can be replaced conveniently.

2. Description of the Related Art

In general, a pair of conventional eyeglasses includes a spectacles frame and two temples pivotally fitted at both sides of the spectacles frame through pin-joint components such as screws for pivoted movements of temples including inward folding or outward stretching relative to the spectacles frame. However, the process to replace a temple with a new one is inconvenient and takes much time because a user has to remove a screw and re-fix it later with a tool.

Specifically, the temples of a pair of eyeglasses for corrected visual acuity of a user may be replaced with a non-slip temple before specific work or exercise for preventing the pair of eyeglasses from slippage or even drop due to the user's head lowered, perspiration or a strenuous activity. The non-slip temple generally includes eyewear hooks or an elastic band for no slippage of a pair of eyeglasses on a user's face. However, the process to replace temples of a pair of conventional glasses is still uneasy and takes much time.

BRIEF SUMMARY OF THE INVENTION

Thus, an objective of the present invention is to provide a pair of eyeglasses for assembling temples and a spectacles frame without requirement of any screw. Furthermore, the pair of eyeglasses of the present invention features a simple structure for quick replacement of temples.

To achieve this and other objectives, a pair of eyeglasses of the present invention includes a spectacles frame and two temples. The spectacles frame includes two mounting adapter each formed at one of two lateral ends of the spectacles frame. Each mounting adapter is provided with a pivot hole, an opening, and two engaging holes. The pivot hole is extended from an upper end of the mounting adapter toward but spaced from a lower end of the mounting adapter. The pivot hole has a first concave portion and two second concave portions developed around the pivot hole circumferentially. The first concave portion is located between the second concave portions. The opening is provided in an inner surface of the mounting adapter and in communication with the pivot hole. Each engaging hole extends from an outer surface of the mounting adapter to the pivot hole. Each temple includes a front end provided with two spaced connecting rods and a pivot shaft formed at outer ends of the connecting rods. The pivot shaft of each temple is engaged in the pivot hole of a corresponding mounting adapter to allow each temple to be pivoted relative to the spectacles frame between a folded position and an extended position. An outer surface of the pivot shaft is provided with two end portions. When one of the temples is at the folded position, the end portions of the pivot shaft are respectively located in the first concave portion and the opening, and the connecting rods are separated from the engaging holes. When one of the temples is at the extended position, the end portions of the pivot shaft are respectively located in the second concave portions, and the connecting rods are respectively held inside the engaging holes.

In an embodiment, each engaging hole includes a locating slot therein. Each connecting rod is provided with a protrusion thereon, and the protrusion of each connecting rod is coupled with a corresponding locating slot when the temple is at the extended position. The pivot shaft has an elliptical cross section, and one of the end portions is coupled with the outer ends of the connecting rods.

The pair of eyeglasses of the present invention contributes to easily assembling temples and a spectacles frame for a simple structure of a pair of eyeglasses with diversified temples to be replaced quickly.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
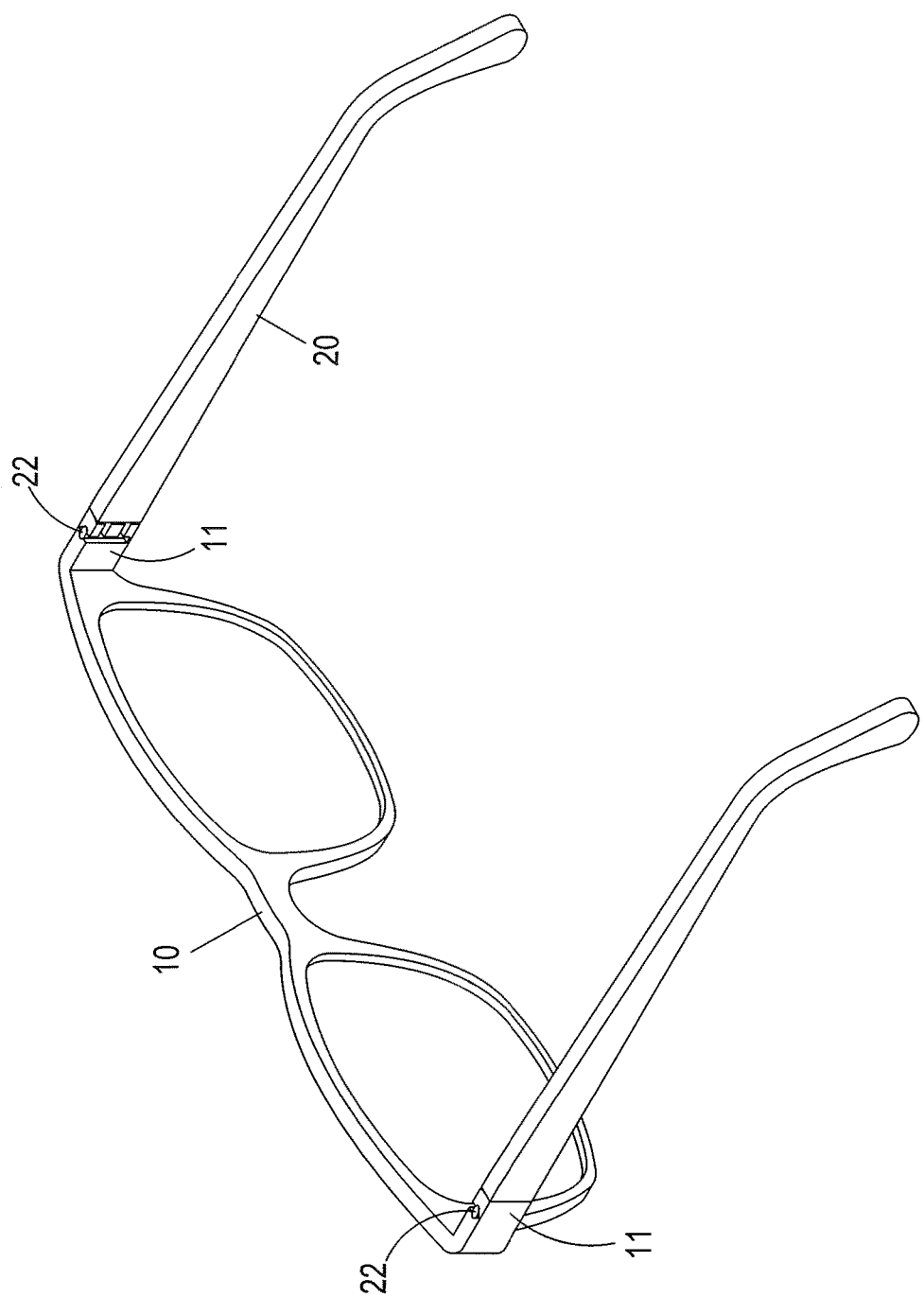
FIG. 1 is a perspective view illustrating a pair of eyeglasses of the present invention.
Figure 2:
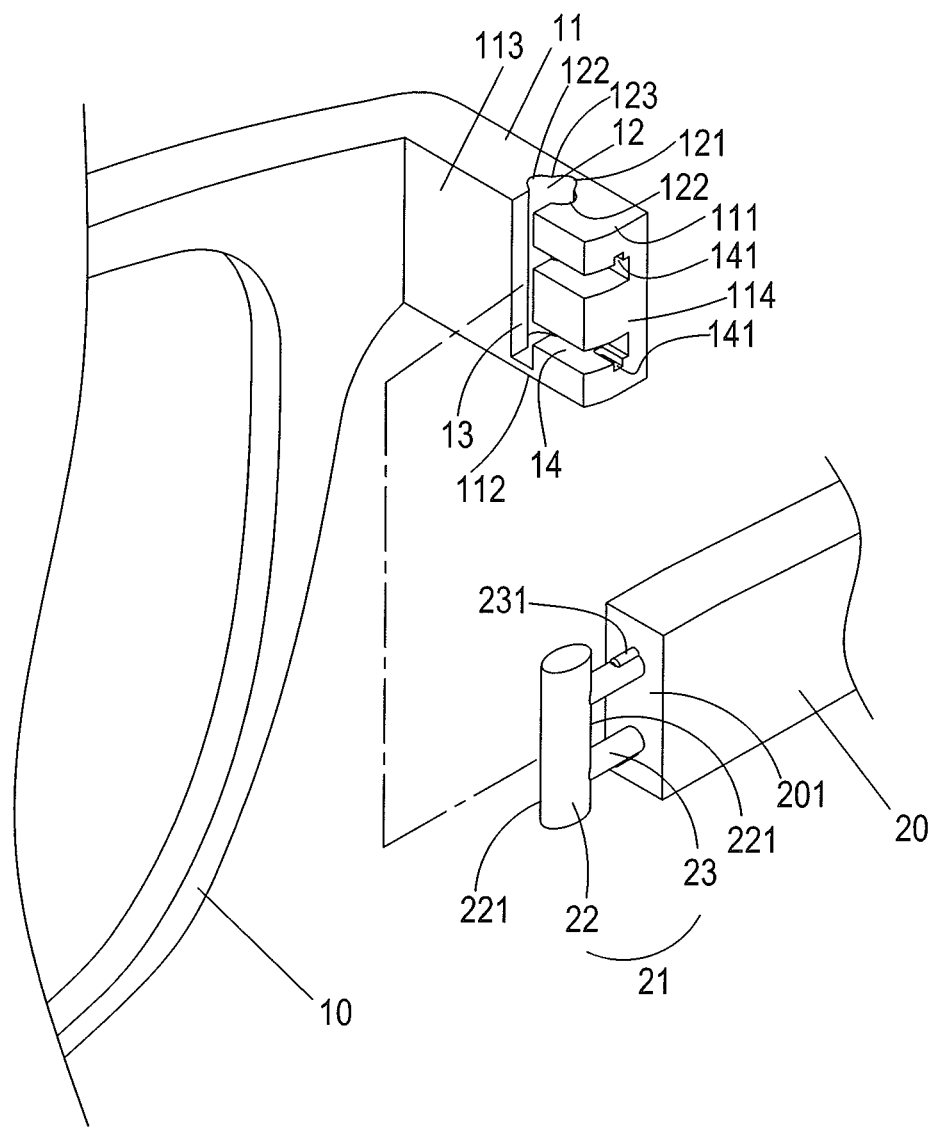
FIG. 2 is a partial, exploded view of the eyeglasses in FIG. 1.

A pair of eyeglasses with conveniently replaceable temples according to the present invention is shown in FIGS. 1 through 4 of the drawings and generally includes a spectacles frame 10 and two temples 20. The spectacles frame 10 is equipped with two mounting adapters 11 respectively extending outwards from two lateral ends thereof. A front end 201 of each temple 20 is provided with a joint portion 21 pivotally fitted at a corresponding mounting adapter 11, so that each temple 20 is able to make pivoted movements including inward folding or outward stretching relative to the spectacles frame 10.

Each mounting adapter 11 is provided with a pivot hole 12, an opening 13, and at least one engaging hole 14. The pivot hole 12 is extended lengthwise from an upper end 111 of the mounting adapter 11 toward but spaced from a lower end 112 of the mounting adapter 11. The pivot hole 12 includes a first concave portion 121 and two second concave portions 122, which are developed around pivot hole 12 circumferentially. The first concave portion 121 is located between the second concave portions 122, and each second concave portion 122 is spaced from the first concave portion 121 at an almost right angle. A curved transition portion 123 is defined between each second concave portion 122 and the first concave portion 121. The opening 13 provided in an inner surface 113 of the mounting adapter 11 is in communication with the pivot hole 12 and opposite to the first concave portion 121. In this embodiment, the mounting adapter 11 is provided with two spaced engaging holes 14. Each engaging hole 14 extends transversely from an outer surface 114 of the mounting adapter 11 to the pivot hole 12, and a locating slot 141 is formed in each engaging hole 14.

The joint portion 21 includes two spaced connecting rods 23 and a pivot shaft 22. Each connecting rod 23 is extended outward and transversely from the front end 201 of the temple 20 and provided with a protrusion 231 thereon. The pivot shaft 22 is formed at outer ends of the connecting rods 23 and extended lengthwise. During assembly, the pivot shaft 22 is inserted into the pivot hole 12 of the mounting adapter 11 from an upper end of a corresponding pivot hole 12 or through the opening 13 such that the pivot shaft 22 is held inside the corresponding pivot hole 12, allowing each temple 20 to be pivoted relative to the spectacles frame 10 between a folded position and an extended position based on the pivot shaft 22 as a pivot. In this embodiment, the pivot shaft 22 has, without limitation, an elliptical cross section. An outer surface of the pivot shaft 22 has two end portions 221 curved exteriorly and opposite to each other transversely, and one of the end portions 221 is coupled with the connecting rods 23.

Figure 3:
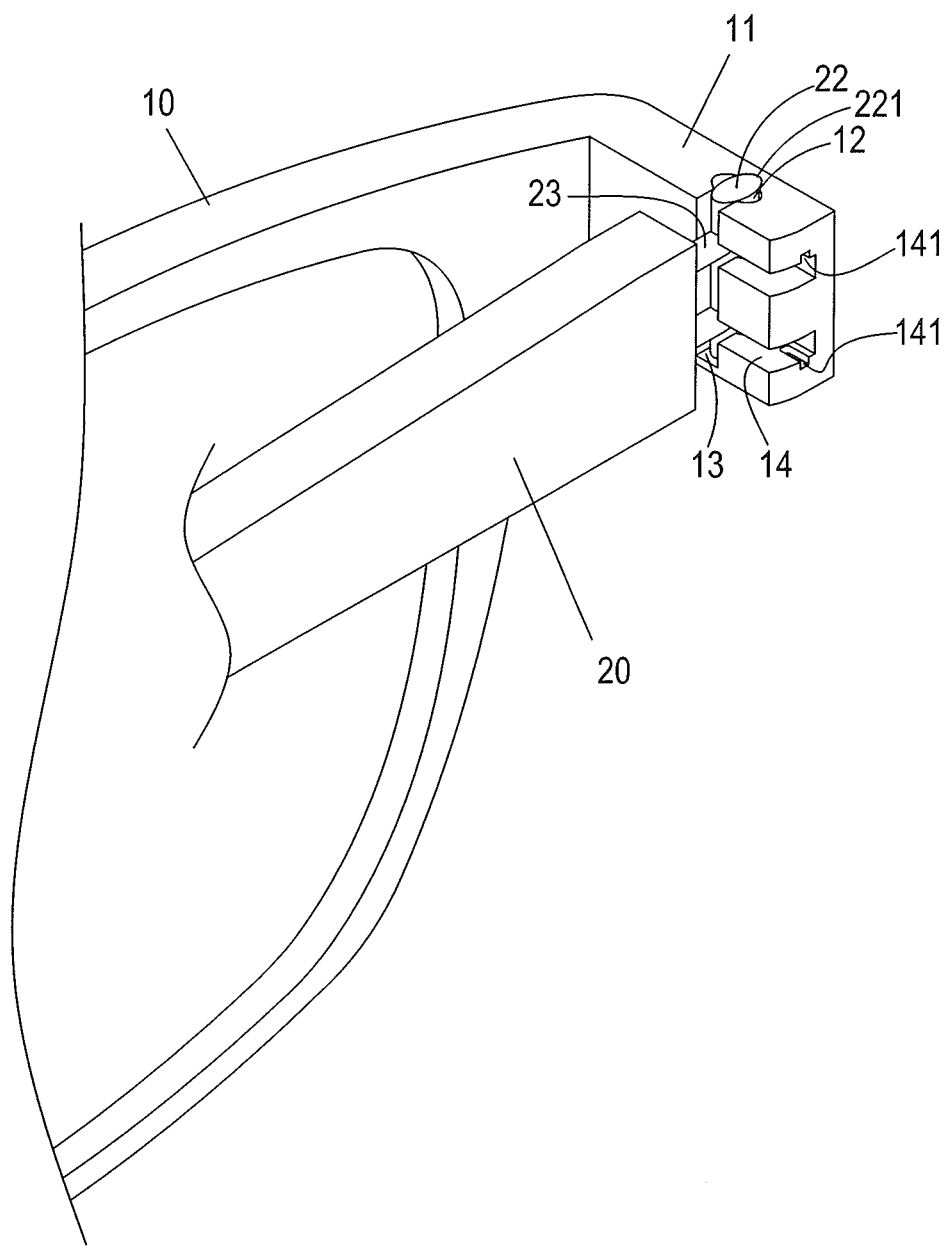
FIG. 3 is a schematic view illustrating a temple in FIG. 2 is coupled with a spectacles frame and stays at a folded position.
Figure 4:
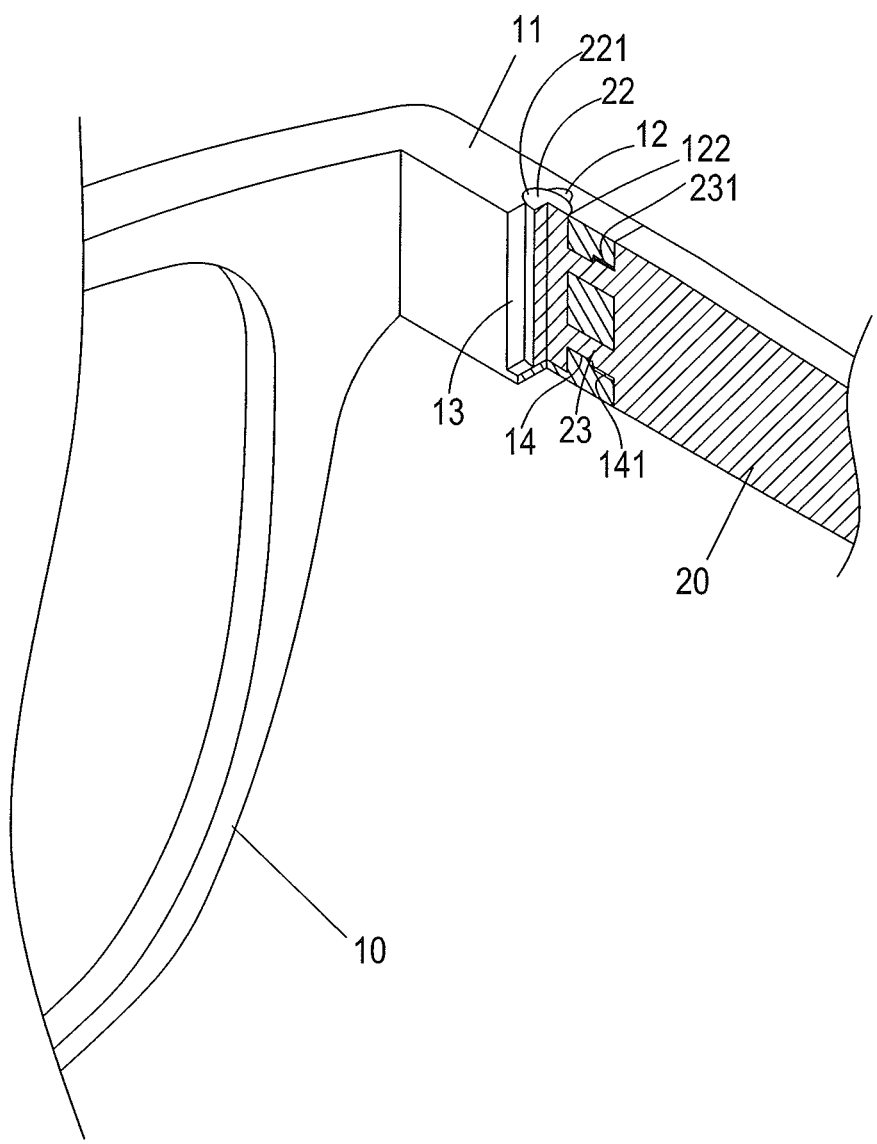
FIG. 4 is a sectional view illustrating the temple in FIG. 2 is coupled with the spectacles frame and stays at an extended position.

FIG. 3 illustrates the temple 20 staying at the folded position, wherein the end portions 221 of the pivot shaft 22 are located in the first concave portion 121 and the opening 13, respectively. The connecting rods 23 are not coupled with the engaging holes 14. As such, the joint portion 21 of each temple 20 can be dismantled from the corresponding pivot hole 12. FIG. 4 illustrates the temple 20 staying at the extended position. The end portions 221 of the pivot shaft 22 are located in the second concave portions 122, and the connecting rods 23 are held inside the engaging holes 14 with each protrusion 231 coupled in a corresponding locating slot 141, so that each temple 20 can be positioned at the extended position. In pivoted movements of each temple 20 between the extended position and the folded position, the outer surface of the pivot shaft 22 contacts one of the transition portions 123.

Figure 5:
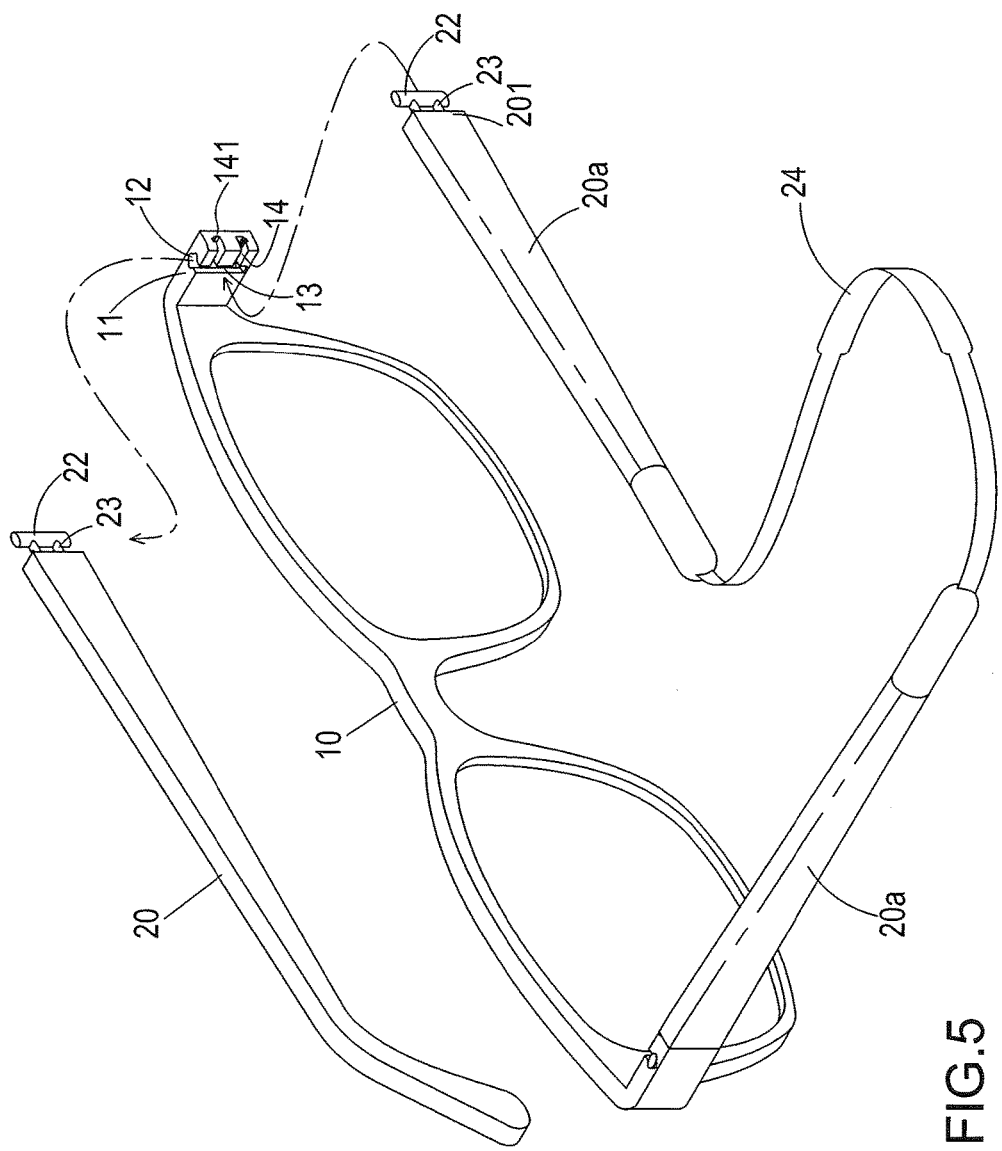
FIG. 5 is a schematic view illustrating temples in FIG. 1 are replaced with a non-slip temple.
Figure 6:
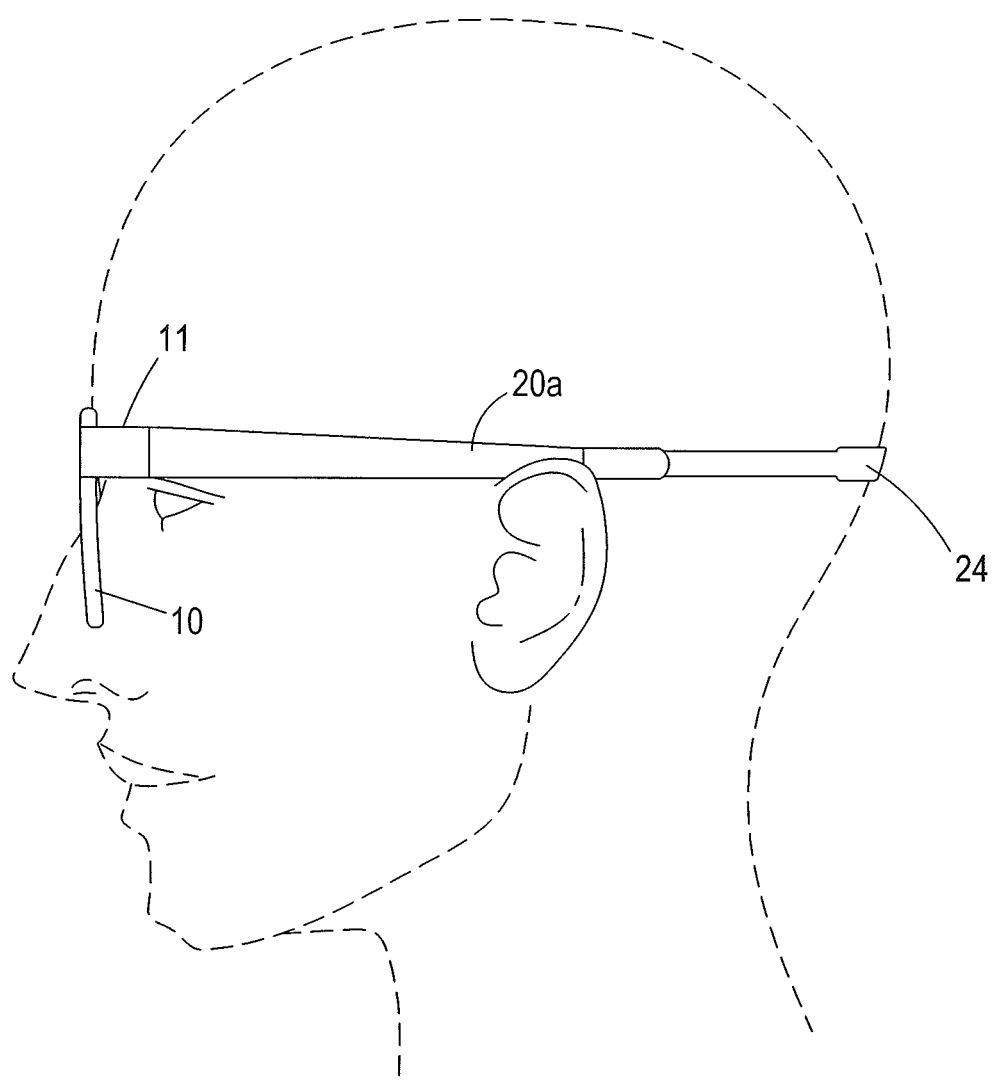
FIG. 6 is a schematic view illustrating the pair of eyeglasses in FIG. 5 is worn on a user.

FIG. 5 illustrates the temples 20 in FIG. 1 are replaced with a non-slip temple which includes two minor temples 20a and an elastic band 24 linking the minor temples 20a. Each minor temple 20a has two connecting rods 23 and a pivot shaft 22 at the front end 201 thereof as usual. During replacement, the pivot shaft 22 of each temple 20, which has stayed at the folded position, should be removed upward and separated from the pivot hole 12. Then, the pivot shaft 22 of each minor temple 20a is held inside a corresponding pivot hole 12 for fast replacement of a whole temple. FIG. 6 illustrates a user who wears the pair of eyeglasses in FIG. 5, wherein the elastic band 24 prevents the pair of eyeglasses from slippage due to perspiration or a strenuous activity. The temples 20 in FIG. 1 can be replaced with the non-slip temple conveniently by a user before work or workout.

The pair of eyeglasses of the present invention allows the temples to be replaced conveniently without any tool. Moreover, the temples can be positioned effectively at the extended position.

The scope of the invention is to be indicated by the appended claims, rather than by the foregoing description, and all changes which come within the meaning and range of equivalency of the claims are intended to be embraced therein.

The invention claimed is:

1. A pair of eyeglasses with conveniently replaceable temples, comprising:

a spectacles frame including two mounting adapter each formed at one of two lateral ends of the spectacles frame, with each mounting adapter provided with a pivot hole, an opening, and two engaging holes, with the pivot hole extending from an upper end of the mounting adapter toward but spaced from a lower end of the mounting adapter, with the pivot hole including a first concave portion and two second concave portions developed around the pivot hole circumferentially, with the first concave portion located between the two second concave portions, with the opening provided in an inner surface of the mounting adapter and in communication with the pivot hole, with each engaging hole extending from an outer surface of the mounting adapter to the pivot hole; and two temple each including a front end thereof, with each temple provided with two spaced connecting rods extending outward from the front end, with a pivot shaft formed at outer ends of the two connecting rods and engaged in the pivot hole of a corresponding mounting adapter to allow each temple to be pivoted relative to the spectacles frame between a folded position and an extended position, with an outer surface of the pivot shaft provided with two end portions, wherein when one of the two temples is at the folded position, the two end portions of the pivot shaft of the temple are respectively located in the first concave portion and the opening, and the two connecting rods of the temple are separated from the two engaging holes, wherein when one of the two temples is at the extended position, the two end portions of the pivot shaft of the temple are respectively located in the two second concave portions, and the two connecting rods are respectively held inside the two engaging holes.

2. The pair of eyeglasses according to claim 1, wherein each engaging hole includes a locating slot therein, with each connecting rod provided with a protrusion thereon, with the protrusion of each connecting rod coupled with a corresponding locating slot when the temple is at the extended position.

3. The pair of eyeglasses according to claim 1, wherein the pivot shaft has an elliptical cross section, and one of the end portions is coupled with the outer ends of the two connecting rods.

* * * * *